(12) United States Patent
Kurouchi et al.

(10) Patent No.: US 8,754,171 B2
(45) Date of Patent: Jun. 17, 2014

(54) POLYESTER COMPOSITION

(71) Applicant: E I Du Pont De Nemours and Company, Wilmington, DE (US)

(72) Inventors: Masahiro Kurouchi, Utsunomiya (JP); Hiroyuki Sumi, Tochigi-ken (JP)

(73) Assignee: E I du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 13/783,842

(22) Filed: Mar. 4, 2013

(65) Prior Publication Data

US 2013/0303660 A1 Nov. 14, 2013

Related U.S. Application Data

(60) Provisional application No. 61/645,203, filed on May 10, 2012, provisional application No. 61/662,401, filed on Jun. 21, 2012, provisional application No. 61/718,590, filed on Oct. 25, 2012, provisional application No. 61/718,596, filed on Oct. 25, 2012.

(51) Int. Cl.
*C08L 67/02* (2006.01)
*H01L 31/0203* (2014.01)
*C08L 23/08* (2006.01)

(52) U.S. Cl.
CPC .............. *C08L 67/02* (2013.01); *C08L 67/025* (2013.01); *H01L 31/0203* (2013.01); *C08L 23/0884* (2013.01)
USPC ........... 525/190; 525/173; 525/176; 525/182; 525/185; 525/437; 525/438; 525/449; 528/300; 528/301

(58) Field of Classification Search
USPC .................................... 525/190; 528/300, 301
See application file for complete search history.

(56) References Cited

U.S. PATENT DOCUMENTS

| 4,243,580 | A * | 1/1981 | Gale | 524/100 |
| 4,753,980 | A | 6/1988 | Deyrup | |
| 6,986,864 | B2 | 1/2006 | Porter | |
| 7,612,130 | B2 * | 11/2009 | Kim | 523/467 |
| 7,923,506 | B2 * | 4/2011 | Cohoon et al. | 524/605 |
| 2005/0260361 | A1 * | 11/2005 | Alms et al. | 428/31 |
| 2008/0125551 | A1 * | 5/2008 | Vollenberg | 525/439 |
| 2009/0176938 | A1 | 7/2009 | Xu et al. | |

FOREIGN PATENT DOCUMENTS

| EP | 1622979 | 9/2008 |
| WO | 2006086334 | 8/2006 |
| WO | 2011053958 | 5/2011 |
| WO | 2011053966 | 5/2011 |
| WO | 2011139648 | 11/2011 |

* cited by examiner

*Primary Examiner* — Mark Kaucher
*Assistant Examiner* — Kregg Brooks
(74) *Attorney, Agent, or Firm* — Loretta Smith; Otha Weaver

(57) ABSTRACT

Compositions comprising: (a) 30 to 65 weight percent of a polyester;
(b) 7 to 25 weight percent of an ethylene copolymer toughener; (c) 5 to 25 weight percent of a copolyether ester elastomer having a shore D hardness of 20 to 50; optionally (d) 15 to 35 weight percent of a halogenated epoxy flame retardant; and (e) when (d) is present in the composition, optionally, 2 to 10 weight percent of a flame retardant synergist;
wherein: the ratio of the combined weight of (b)+(c) relative to the weight of (a) ranges from 0.40 to 0.85; the ratio of the weight of (b) relative to that of (c) ranges from 0.3 to 2.5; and the Gardner impact of the composition, when molded, is at least 4.2 J, measured at −40° C. according to ASTM D5420. Methods of making articles by molding these melt-mixed compositions.

14 Claims, No Drawings

POLYESTER COMPOSITION

CROSS REFERENCE TO RELATED APPLICATIONS

This application claims priority from the following US Provisional Applications: U.S. 61/718,596, filed 25 Oct. 2012; U.S. 61/718,590, filed 25 Oct. 2012; U.S. 61/662,401, filed 21 Jun. 2012; and U.S. 61/645,203, filed 10 May 2012, all of which are currently pending and hereby incorporated herein by reference in their entirety.

OVERVIEW

Described herein are compositions having low temperature impact, and more specifically, compositions comprising polyesters, a toughener comprising an ethylene copolymer, a copolyether ester elastomer, and optionally, a flame retardant, and which benefit the manufacture of photovoltaic junction boxes and connectors, and other articles needing low temperature impact resistance.

Because of the current emphasis on developing renewable sources of power generation, photovoltaic [PV] cell technology is now a constant subject for research and improvement. Power generated from PV cells is typically routed through a junction box, which connects the PV panels to the electrical outputs of the PV panels and helps protect the electrical connections from the environment. Junction boxes must be able to withstand exposure to a wide range of temperature. When manufactured from polymeric materials, junction boxes should have low temperature impact in order to avoid structural damage that could cause the PV panels to fail in generating power.

International Application Publication Number [App. Pub. No.] WO 2011/139648 discloses junction boxes made from polyester compositions. EP Patent No. 1622979B1 discloses polyester compositions comprising polyester, an ethylene acrylate copolymer, and a thermoplastic elastomeric polyester, asserted as useful in manufacturing parts requiring smooth surfaces. U.S. App. Pub. No. US2009/0176938 discloses polyester compositions comprising polyester, an ethylene acrylate copolymer, and a thermoplastic elastomeric polyester. U.S. Pat. No. 6,986,864 discloses polyester compositions comprising a polyester, an ethylene acrylate copolymer, and a thermoplastic elastomeric polyester, asserted to have improved crystallization rates.

Described herein are compositions comprising:
(a) 30 to 65 weight percent of a polyester,
(b) 7 to 25 weight percent of an ethylene copolymer toughener;
(c) 5 to 25 weight percent of a copolyether ester elastomer having a shore D hardness that ranges from 20 to 50;
(d) optionally, a flame retardant; and
(e) when (d) is present in the composition, optionally a flame retardant synergist,
wherein:
the ratio of the combined weight of (b)+(c) relative to the weight of (a) ranges from 0.40 to 0.85;
the ratio of the weight of (b) relative to that of (c) ranges from 0.3 to 2.5; and
the Gardner impact of the composition, when molded, is at least 4.2 J, measured at −40° C. according to ASTM D5420.

In any variation of the compositions described herein, the shore D hardness of the copolyether ester elastomer may range from 20 to less than about 50 while the ratio of the weight of (b) relative to that of (c) may range from 0.3 to 2.5, and while the ratio of the combined weight of (b) and (c) relative to the weight of (a) may range from 0.40 to 0.85. Further, in any variation of these compositions, the toughener is at least one ethylene copolymer toughener. The polyester in any of these compositions may be poly(ethylene terephthalate), poly(trimethylene terephthalate), poly(1,4-butylene terephthalate) or mixtures of these. Any variation of these compositions may include at least one flame retardant, at least one flame retardant synergist, and/or at least one colorant.

Also described herein are methods of making an article comprising the step of molding any variation of the compositions described herein and melt-mixed. Also described herein are articles comprising any of the compositions described herein and/or articles made by the methods described herein, especially an article that is or comprises a photovoltaic junction box.

DETAILED DESCRIPTION

Definitions and Abbreviations

The following definitions and abbreviations are to be used to interpret the meaning of the terms discussed in the description and recited in the claims.

As used herein, the term "long-chain ester units" as applied to units in a polymer chain refers to the reaction product of a long-chain glycol with a dicarboxylic acid. Suitable long-chain glycols are poly(alkylene oxide) glycols having terminal (or as nearly terminal as possible) hydroxyl groups and having a number average molecular weight of from about 400 to about 6000, and preferably from about 600 to about 3000.

As used herein, the term "short-chain ester units" as applied to units in a polymer chain of the copolyether ester elastomer refers to low molecular weight compounds or polymer chain units having molecular weights less than about 550. These units are made by reacting a diol or mixture of diols in which the diol has a molecular weight below about 250 with a dicarboxylic acid to form ester units.

As used herein, the term "aliphatic dicarboxylic acids" refers to carboxylic acids having two carboxyl groups each attached to a saturated carbon atom.

As used herein, the term "aromatic dicarboxylic acids" refers to dicarboxylic acids having two carboxyl groups each attached to a carbon atom in a carbocyclic aromatic ring structure.

It is not necessary that both functional carboxyl groups be attached to the same aromatic ring and where more than one ring is present, they can be joined by aliphatic or aromatic divalent radicals or divalent radicals such as —O— or —SO2-.

As used herein, the term "diols" includes equivalent ester-forming derivatives such as those mentioned. Any molecular weight requirements refer to the corresponding diols, not their derivatives.

As used herein, the term "Shore D hardness" refers to the hardness of a polymeric material determined according to ASTM D2240 Type D.

As used herein, the terms "Gardner impact", "Gardner impact strength" refer to the impact property of an article measured according to ASTM D5420. This test method measures the impact resistance of a flat, rigid plastic specimen by means of a striker impacted by a falling weight. For this reason, Gardner impact strength is also termed Falling Dart impact strength and evaluates the impact strength, that is, toughness of a plastic material. It is a test measurement traditionally used to identify appropriate materials for applications involving impact or to evaluate the effect of secondary finishing operations or other environmental factors on the impact properties of plastics.

As used herein, the term "weight ratio" refers to the ratio of two components in a composition on a weight basis. The concentration of other ingredients in the composition are not used, and do not affect, the weight ratio calculation. For example, if 10 grams of component A and 20 grams of component B are used in a composition, the weight ratio of components A to B is 0.5.

Ranges

Any range set forth herein expressly includes its endpoints unless explicitly stated otherwise. Setting forth an amount, concentration, or other value or parameter as a range specifically discloses all ranges formed from any pair of any upper range limit and any lower range limit, regardless of whether such pairs are separately disclosed herein. The processes and articles described herein are not limited to the specific values disclosed in defining a range in the description.

Preferred Variants

The disclosure herein of any variants in terms of materials, methods, steps, values, and/or ranges, etc.—whether identified as preferred variants or not—of the processes, compositions and articles described herein is specifically intended to disclose any process and article that includes any combination of such materials, methods, steps, values, ranges, etc. For the purposes of providing photographic and sufficient support for the claims, any such disclosed combination is specifically intended to be a preferred variant of the processes, compositions, and articles described herein.

Generally

Described herein are compositions comprising at least one polyester, an ethylene copolymer toughener, at least one copolyether ester elastomer, and optionally, a flame retardant; and when the flame retardant is present in the composition, optionally a flame retardant synergist. These compositions resolve the technical problem of including relatively low levels of additives that improve impact strength and at the same time yield, when molded, articles having a sufficient Gardner impact strength to operate reliably during continuous exposure to temperature extremes. Specifically, these compositions resolve this technical problem by including in the recited ratios both an ethylene copolymer toughener and at least one copolyether ester elastomer, which has a shore D hardness between 20 and 50, preferably below 45.

More specifically, in the compositions described herein, the ratio of the combined weight of the ethylene copolymer toughener (b) and the copolyether ester elastomer (c) relative to the weight of the polyester (a) ranges from about 0.40 to about 0.85, preferably from 0.45 to 0.85, and more preferably from 0.55 to 0.85.

Calculating this ratio is done according to Equation 1.

Equation 1:

$$\frac{\text{weight, ethylene copolymer toughener} + \text{weight, copolyether ester elastomer}}{\text{weight, polyester}}$$

For example, if a composition described herein had 11 grams ethylene copolymer toughener and 14 grams copolyether ester elastomer, the combined weight would be 25 grams. If the weight of the polyester in the composition were 55 grams, then as calculated in Equation 2, the ratio is 0.45.

$$25/55 = 0.45 \quad \text{Equation 2:}$$

Moreover, in the compositions described herein, the Shore D hardness of the copolyether ester elastomer ranges from 20 to 50 and the Gardner impact measured at −40° C. according to ASTM D5420 is at least 4.2 J. Also, in these compositions, the ratio of the weight of the ethylene copolymer toughener relative to the weight of the copolyether ester elastomer ranges from about 0.3 to about 2.5. Calculating this ratio is done according to Equation 3.

Equation 3:

$$\frac{\text{weight, ethylene copolymer toughener}}{\text{weight, copolyether ester elastomer}}$$

It is important to clarify that, when the ratio of the combined weight of the ethylene copolymer toughener (b) and the copolyether ester elastomer (c) relative to the weight of the polyester (a) is less than about 0.4, the Gardner impact of the composition, when molded, will be relatively low, even if the hardness of the copolyether ester elastomer is below 50 Shore D. Also, when this ratio is greater than about 0.85, the Gardner impact of the composition, when molded, may still be desirable but other of its physical properties will likely deteriorate.

Consequently, the novel achievement of these compositions, when molded, is to provide suitable Gardner impact values using less than an equal amount of ethylene copolymer toughener plus copolyether ester elastomer compared to the amount of the polyester. This achievement makes these compositions useful especially in polymeric photovoltaic junction boxes and other applications in which sufficient impact strength is needed to withstand long-term exposure of temperature extremes.

Further, an additional novel achievement of these compositions is that the addition of 15 to 35 weight percent of a halogenated epoxy flame retardant, based on the total weight of the composition, increases the Gardner impact of the molded compositions to at least 7 J, preferably to at least 10 J, and more preferably, to at least 20 J. These Gardner impact values are surprising compared to those of the same molded compositions in which the flame retardant is a halogenated polystyrene flame retardant.

Polyester (a)

The compositions described herein may comprise polyesters derived from one or more aromatic dicarboxylic acids and one or more diols having two or more carbon atoms. The one or more aromatic dicarboxylic acids may include esters. In preferred polyesters, the aromatic dicarboxylic acids include one or more of terephthalic acid, isophthalic acid, and 2,6-naphthalene dicarboxylic acid, and combinations of these. Hydroxycarboxylic acids such as hydroxybenzoic acid may be used as comonomers.

The diol component useful in preparing the polyesters described herein include one or more of $HO(CH_2)_nOH$ (I); $HO(CH_2CH_2O)_mCH_2CH_2OH$ (II); and $HO(CH_2CH_2CH_2CH_2O)_zCH_2CH_2CH_2CH_2OH$ (III), wherein n is an integer of 2 to 10, m on average is 1 to 4, and z is on average about 7 to about 40. (II) and (III) may be a mixture of compounds in which m and z vary but are not necessarily integers as m and z are averages.

Suitable polyesters include, without limitation, poly(ethylene terephthalate) (PET), poly(trimethylene terephthalate) (PTT), poly(1,4-butylene terephthalate) (PBT), poly(ethylene 2,6-naphthoate) (PEN), and copolymers, and mixtures of these. Of these, preferred are poly(ethylene terephthalate)

(PET), poly(trimethylene terephthalate) (PTT), and poly(1,4-butylene terephthalate) (PBT) with PBT most preferred. Examples of commercially available polyesters include Crastin® PBT polyester resins, Rynite® poly(ethylene terephthalate) polyester resins, and Sorona polyester resins, all available from E.I. du Pont de Nemours and Co., Wilmington, Del.

Based on the available data for polybutylene terephthalate (PBT), polyethylene terephthalate (PET), and polytrimethylene terephthalate (PTT), these three polyesters provide Gardner impact values of at least 4.2 J. Thus, compositions described herein comprising PBT, PET, and PTT and mixtures of these are expected to exhibit a Gardner impact measured at −40° C. according to ASTM D5420 of at least 4.2 J.

In these compositions, when the polyester is polyethylene terephthalate or polybutylene terephthalate, the best impact properties are obtained when the ratio of the combined weight of the ethylene copolymer toughener and copolyether ester elastomer relative to the weight of the polyester ranges from greater than about 0.45 to 0.85. When the polyester is polytrimethylene terephthalate, the best impact properties are obtained when the ratio of the combined weight of the ethylene copolymer toughener and the copolyether ester elastomer relative to the weight of the polyester ranges from greater than about 0.55 to 0.85.

The polyester in the compositions described herein ranges from 30 to 65 weight percent, preferably from 30 to 60 weight percent, more preferably from 30 to 55 weight percent of the total weight of the composition.

Ethylene Copolymer Tougheners (b)

The compositions described herein comprise one or more ethylene copolymer tougheners. The ethylene copolymer toughener is typically an elastomer having a relatively low melting point, generally lower than 200° C., preferably lower than 150° C.

Ethylene copolymer tougheners described herein comprise ethylene monomer copolymerized with at least one monomer selected from alkyl acrylates, alkyl methacrylates, alkyl ethylacrylates, vinyl acetate, glycidyl acrylate, glycidyl methacrylate, 2-isocyanatoethyl acrylate, 2-isocyanatoethyl methacrylate, 2-hydroxyethyl acrylate, 2-hydroxyethyl methacrylate, acrylic acid, methacrylic acid, and combinations of these.

The alkyl group is selected from C1 to C8 alkyl groups, preferably from C1 to C4 alkyl groups, and more preferably from C1 to C2 alkyl groups. The alkyl groups may be linear, branched, or cyclic. Glycidyl acrylate, glycidyl methacrylate, 2-isocyanatoethyl acrylate, 2-isocyanatoethyl methacrylate, 2-hydroxyethyl acrylate, 2-hydroxyethyl methacrylate, acrylic acid, and methacrylic acid are functionalized monomers.

When the ethylene copolymer toughener comprises at least one functionalized monomer, the combined weight percent of copolymerized functionalized monomer(s) in the ethylene copolymer toughener ranges from 0.5 to 20 weight percent, preferably from 1 to 10 weight percent, based on the total weight of the copolymerized monomers in the ethylene copolymer toughener.

The concentration of copolymerized ethylene monomer in the ethylene copolymer toughener ranges from 40 to 99.5 weight percent, preferably 50 to 90 weight percent, more preferably from 50 to 75 weight percent ethylene, based on the total weight of copolymerized monomers in the ethylene copolymer toughener. When present, the concentration of the at least one alkyl acrylate, alkyl methacrylate, alkyl ethylacrylate, and/or vinyl acetate copolymerized monomer(s) in the ethylene copolymer toughener ranges from 10 to 60 weight percent, and preferably from 15 to 35 weight percent, based on the total weight of the copolymerized monomers in the ethylene copolymer toughener.

Preferred toughening agents include those listed in U.S. Pat. No. 4,753,980 at column 3:20-61, which portion is hereby incorporated herein by reference. Especially preferred ethylene copolymer tougheners are ethylene copolymers comprising copolymerized monomers of ethylene, ethyl acrylate, and glycidyl methacrylate and ethylene copolymers comprising ethylene, butyl acrylate, and glycidyl methacrylate monomers.

The ethylene copolymer toughener in these compositions ranges from 7 to 25 weight percent, preferably from 9 to 20 weight percent, and more preferably from 9 to 15 weight percent, of the total weight of the composition.

Copolyether Ester Elastomers (c)

Suitable copolyether ester elastomers in the polyester compositions described herein have a multiplicity of recurring long-chain ester units and short-chain ester units joined head-to-tail through ester linkages, said long-chain ester units being represented by formula (A):

(A)

and said short-chain ester units being represented by formula (B):

(B)

wherein G is a divalent radical remaining after the removal of terminal hydroxyl groups from poly(alkylene oxide)glycols having a number average molecular weight of between about 400 and about 6000, or preferably between about 400 and about 3000; R is a divalent radical remaining after removal of carboxyl groups from a dicarboxylic acid having a molecular weight of less than about 300; D is a divalent radical remaining after removal of hydroxyl groups from a diol having a molecular weight less than about 250.

Long-chain ester units are prepared by reaction of a long-chain glycol with a dicarboxylic acid. Preferred poly(alkylene oxide) glycols include poly(tetramethylene oxide) glycol, poly(trimethylene oxide) glycol, poly(propylene oxide) glycol, poly(ethylene oxide) glycol, copolymer glycols of these alkylene oxides, and block copolymers such as ethylene oxide-capped poly(propylene oxide) glycol. Mixtures of two or more of these glycols can be used.

Short-chain ester units are made by reacting a low molecular weight diol or a mixture of diols (molecular weight below about 250) with a dicarboxylic acid to form ester units represented by Formula (B) above. Included among the low molecular weight diols for forming suitable short-chain ester units are acyclic, alicyclic and aromatic dihydroxy compounds. Preferred are diols with about 2 to 15 carbon atoms such as ethylene, propylene, isobutylene, tetramethylene, 1,4-pentamethylene, 2,2-dimethyltrimethylene, hexamethylene and decamethylene glycols, dihydroxycyclohexane, cyclohexane dimethanol, resorcinol, hydroquinone, 1,5-dihydroxynaphthalene, etc. Especially preferred are aliphatic diols containing 2-8 carbon atoms, and a more preferred diol is 1,4-butanediol. Included among the suitable bisphenols are bis(p-hydroxy)diphenyl, bis(p-hydroxyphenyl)methane, and bis(p-hydroxyphenyl)propane. Equivalent ester-forming derivatives of diols are also useful.

These materials are made by reacting a low molecular weight diol or a mixture of diols (molecular weight below about 250) with a dicarboxylic acid to form ester units represented by Formula (B) above. Suitable low molecular weight diols in these elastomers include acyclic, alicyclic and aromatic dihydroxy compounds. Preferred diols are those with about 2-15 carbon atoms such as ethylene, propylene, isobutylene, tetramethylene, 1,4-pentamethylene, 2,2-dimethyltrimethylene, hexamethylene and decamethylene glycols, dihydroxycyclohexane, cyclohexane dimethanol, resorcinol, hydroquinone, 1,5-dihydroxynaphthalene, etc. Especially preferred diols are aliphatic diols containing 2-8 carbon atoms, and a more preferred diol is 1,4-butanediol. Included among the bisphenols which can be used are bis(p-hydroxy)diphenyl, bis(p-hydroxyphenyl)methane, and bis(p-hydroxyphenyl)propane. Equivalent ester-forming derivatives of diols are also useful.

Dicarboxylic acids that can react with the foregoing long-chain glycols and low molecular weight diols to produce the copolyether ester elastomers are aliphatic, cycloaliphatic or aromatic dicarboxylic acids of a low molecular weight, i.e., having a molecular weight of less than about 300. The term "dicarboxylic acids" as used herein includes functional equivalents of dicarboxylic acids that have two carboxyl functional groups that perform substantially like dicarboxylic acids in reaction with glycols and diols in forming copolyether ester elastomers. These equivalents include esters and ester-forming derivatives such as acid halides and anhydrides. The molecular weight requirement pertains to the acid and not to its equivalent ester or ester-forming derivative.

Thus, an ester of a dicarboxylic acid having a molecular weight greater than 300 or a functional equivalent of a dicarboxylic acid having a molecular weight greater than 300 are included provided the corresponding acid has a molecular weight below about 300. The dicarboxylic acids can contain any substituent group(s) or combination that does not substantially interfere with the copolyether ester elastomer formation.

Aliphatic dicarboxylic acids are carboxylic acids having two carboxyl groups each attached to a saturated carbon atom. If the carbon atom to which the carboxyl group is attached is saturated and is in a ring, the acid is cycloaliphatic. Aliphatic or cycloaliphatic acids having conjugated unsaturation often cannot be used because homopolymerization results. However, some unsaturated acids, such as maleic acid, may be used.

Aromatic dicarboxylic acids are dicarboxylic acids having two carboxyl groups each attached to a carbon atom in a carbocyclic aromatic ring structure. Representative useful aliphatic and cycloaliphatic acids that can be used include sebacic acid; 1,3-cyclohexane dicarboxylic acid; 1,4-cyclohexane dicarboxylic acid; adipic acid; glutaric acid; 4-cyclohexane-1,2-dicarboxylic acid; 2-ethylsuberic acid; cyclopentanedicarboxylic acid decahydro-1,5-naphthylene dicarboxylic acid; 4,4'-bicyclohexyl dicarboxylic acid; decahydro-2,6-naphthylene dicarboxylic acid; 4,4'-methylenebis(cyclohexyl) carboxylic acid; and 3,4-furan dicarboxylic acid. Preferred acids are cyclohexane dicarboxylic acids and adipic acid.

Representative aromatic dicarboxylic acids include phthalic, terephthalic and isophthalic acids; dibenzoic acid; substituted dicarboxyl compounds with two benzene nuclei such as bis(p-carboxyphenyl)methane; p-oxy-1,5-naphthalene dicarboxylic acid; 2,6-naphthalene dicarboxylic acid; 2,7-naphthalene dicarboxylic acid; 4,4'-sulfonyl dibenzoic acid and C1 to C12 alkyl and ring substitution derivatives thereof, such as halo, alkoxy, and aryl derivatives. Hydroxy acids such as p-(beta-hydroxyethoxy)benzoic acid may also be used so long as an aromatic dicarboxylic acid is also used.

Aromatic dicarboxylic acids are preferred for preparing the copolyether ester elastomers described herein. Among the aromatic acids, those with 8 to 16 carbon atoms are preferred, particularly terephthalic acid alone, or in a mixture with phthalic and/or isophthalic acids.

The copolyether ester elastomers described herein preferably comprise from about 15 to about 99 weight percent short-chain ester units corresponding to Formula (B) above, the remainder being long-chain ester units corresponding to Formula (A) above. More preferably, the copolyether ester elastomers described herein comprise from at or about 20 to at or about 95 weight percent, and even more preferably from at or about 50 to at or about 90 weight percent short-chain ester units, where the remainder comprises long-chain ester units. More preferably, at least about 70 percent of the groups represented by R in Formulae (A) and (B) above are 1,4-phenylene radicals and at least about 70 percent of the groups represented by D in Formula (B) above are 1,4-butylene radicals and the sum of the percentages of R groups which are not 1,4-phenylene radicals and D groups that are not 1,4-butylene radicals does not exceed 30 percent. If a second dicarboxylic acid is used to prepare the copolyether ester elastomer, isophthalic acid is preferred; if a second low molecular weight diol is used, ethylene glycol, 1,3-propanediol, cyclohexanedimethanol, or hexamethylene glycol are preferred.

A mixture of two or more copolyether ester elastomers may be used in the compositions described herein. That is, the weight percent of the copolyether ester elastomer—whether a single or a mixture is used—must fall within the range of short-chain ester units and/or long-chain ester units disclosed herein. For example, in a mixture that contains equal amounts of two copolyether ester elastomers, one copolyether ester elastomer can contain 60 weight percent short-chain ester units and the other resin can contain 30 weight percent short-chain ester units for a weighted average of 45 weight percent short-chain ester units.

Preferred copolyether ester elastomers include, but are not limited to, copolyether ester elastomers prepared from monomers comprising (1) poly(tetramethylene oxide) glycol; (2) a dicarboxylic acid selected from isophthalic acid, terephthalic acid and mixtures of these; and (3) a diol selected from 1,4-butanediol, 1,3-propanediol and mixtures of these, or from monomers comprising (1) poly(trimethylene oxide) glycol; (2) a dicarboxylic acid selected from isophthalic acid, terephthalic acid and mixtures of these; and (3) a diol selected from 1,4-butanediol, 1,3-propanediol and mixtures of these, or from monomers comprising (1) ethylene oxide-capped poly(propylene oxide) glycol; (2) dicarboxylic acid selected from isophthalic acid, terephthalic acid and mixtures of these; and (3) a diol selected from 1,4-butanediol, 1,3-propanediol, and mixtures of these.

Preferably, the copolyether ester elastomers described herein are made from esters or mixtures of esters of terephthalic acid and/or isophthalic acid, 1,4-butanediol and poly(tetramethylene ether)glycol or poly(trimethylene ether) glycol or ethylene oxide-capped polypropylene oxide glycol, or are prepared from esters of terephthalic acid, e.g. dimethylterephthalate, 1,4-butanediol and poly(ethylene oxide)glycol. More preferably, the copolyether ester elastomers are prepared from esters of terephthalic acid, e.g. dimethylterephthalate, 1,4-butanediol and poly(tetramethylene ether) glycol. Examples of suitable copolyether ester elastomers are commercially available under the trademark Hytrel® from E.I. du Pont de Nemours and Company, Wilmington, Del.

The copolyether ester elastomer in these compositions ranges from 5 to 25 percent, preferably from 9 to 25 percent, and more preferably from 7 to 15 percent, of the total weight of the composition.

Flame Retardants (d)

The optional flame retardant may be selected from the following, without limitation: metal oxides (wherein the metal may be aluminum, iron, titanium, manganese, magnesium, zirconium, zinc, molybdenum, cobalt, bismuth, chromium, tin, antimony, nickel, copper and tungsten), metal powders (wherein the metal may be aluminum, iron, titanium, manganese, zinc, molybdenum, cobalt, bismuth, chromium, tin, antimony, nickel, copper and tungsten), metal salts such as zinc borate, zinc metaborate, barium metaborate, zinc carbonate, magnesium carbonate, calcium carbonate and barium carbonate, metal phosphinates (wherein the metal may be aluminum, zinc and calcium), halogenated organic compounds like decabromodiphenyl ether and halogenated epoxy compounds, halogenated polymer such as poly(bromostyrene) and brominated polystyrene, polymers of brominated styrenes, copolymer of a halostyrene and glycidyl (meth) acrylate, brominated epoxy resins, brominated polycarbonates, poly(pentabromobenzyl acrylate), phosphorus containing compounds such as polyphosphazenes, organophosphates and metal phosphinates, melamine pyrophosphate, melamine containing compound (such as melamine cyanurate), melamine polyphosphate, red phosphorus, and combinations of these.

When present, the flame retardant comprises from about 1 to 40 percent, preferably from about 5 to 35 weight percent, and more preferably from about 10 to 30 weight percent, of the total weight percent of the composition.

Preferred flame retardants in these compositions include halogenated polystyrene and halogenated epoxy flame retardants. The halogenated epoxy flame retardant is preferably brominated and/or chlorinated epoxy flame retardants, and more preferably brominated epoxy flame retardants. An example of a brominated epoxy flame retardant is brominated epoxy flame retardants prepared from the reaction of tetrabromobisphenol-A and an epoxy compound.

When the flame retardant is halogenated polystyrene, its concentration ranges from about 1 to about 40 weight percent, preferably from about 5 to 35 weight percent, and more preferably from about 10 to about 30 weight percent, of the total weight of the composition.

When the flame retardant is a halogenated epoxy flame retardant, its concentration ranges from about 1 to about 40 weight percent, preferably from about 15 to 35 weight percent, and more preferably from about 20 to about 30 weight percent, of the total weight of the composition.

Flame Retardant Synergist (e)

When the compositions described herein include a flame retardant, they may also optionally include a flame retardant synergist. Suitable flame retardant synergists include, without limitation, any of antimony oxides, antimony pentoxide, sodium antimonate, zinc borate and combinations of these.

When used in the compositions described herein, the concentration of the flame retardant synergist ranges from 2 to 10 weight percent, and preferably from 4 to 10 weight percent, of the total weight of the composition.

Additional Ingredients

The compositions described herein may further comprise one or more heat stabilizers, one or more oxidative stabilizers, one or more ultraviolet light stabilizers, one or more lubricants, coloring agents, drip suppressants, and other ingredients as long as the additional ingredients do not adversely affect the physical properties of the composition.

The one or more heat stabilizers may be copper salts and/or derivatives of these, hindered amine antioxidants, phosphorus antioxidants, and combinations of these. The one or more oxidative stabilizers may include, without limitation, phosphorus antioxidants (e.g. phosphite or phosphonite stabilizers), hindered phenol stabilizers, aromatic amine stabilizers, thioesters, and phenolic based anti-oxidants that hinder thermally induced oxidation of polymers in high temperature applications.

Making Compositions and Articles Described Herein

The compositions described herein are melt-mixed blends, wherein all the polymeric components are well-dispersed within each other and all the non-polymeric ingredients are well-dispersed such that the blend forms a unified whole. They are made by blending the components in any order or combination, at any convenient temperature as long as the polymeric ingredients are in the melt or molten state. Blending or mixing temperatures are easily determined by one of knowledge in the art.

Any melt-mixing method may be used to combine the polymeric components and non-polymeric components. For example, the polymeric components and non-polymeric ingredients may be added to a melt mixer, such as a single or twin-screw extruder, a blender, a single or twin-screw kneader; or a Banbury mixer, either all at once through a single step addition, or in a stepwise fashion, and then melt-mixed. When adding the polymeric components and non-polymeric ingredients in a stepwise fashion, part of the polymeric components and/or non-polymeric ingredients are first added and melt-mixed with the remaining polymeric components and non-polymeric ingredients being subsequently added and further melt-mixed until a well-mixed composition is obtained. Pellets of these compositions can be made for future use in molding electrical connectors and other articles.

The compositions described herein may be shaped into articles using methods known to those skilled in the art, such as injection molding, blow molding, injection blow molding, extrusion, thermoforming, melt casting, vacuum molding, rotational molding, calendar molding, slush molding, filament extrusion and fiber spinning.

The compositions of this invention may be used in the preparation of molded or extruded articles such as various electric and electronic components and electrical connectors for automobiles, housings for electrical and electronic components in automobiles such as sensors, ECU (Engine Control Unit) boxes and fuse boxes, housings for various electric and electronic components such coil formers, bobbins and various solenoids, and electrical junction boxes for photovoltaic panels.

Making articles comprising the compositions described herein comprise molding a melt-mixed composition comprising:

(a) 30 to 65 weight percent of a polyester;
(b) 7 to 25 weight percent of an ethylene copolymer toughener;
(c) 5 to 25 weight percent of a copolyether ester elastomer having a shore D hardness that ranges from 20 to 50;
(d) optionally, a flame retardant and
(e) when (d) is present in the composition, optionally a flame retardant synergist,
wherein:
the ratio of the combined weight of (b) and (c) relative to the weight of (a) ranges from 0.40 to 0.85;
the ratio of the weight of (b) relative to that of (c) ranges from 0.3 to 2.5; and
the Gardner impact of the article is at least 4.2 J, measured at −40° C. according to ASTM D5420.

EXAMPLES

The present invention is illustrated by, but not limited to, the following examples (E) and comparative examples (C).

Materials

Examples and Comparative Examples of the compositions described herein may comprise the following materials. Unless otherwise indicated, the weight percent of each material used in the Examples and the Comparative Examples is based on the total weight of the composition.

Table 1 shows the weight percent of each material in the Examples and the Comparative Examples.

Polyester A—polybutylene terephthalate available from E.I. DuPont de Nemours and Company, Wilmington, Del.

Polyester B—polyethylene terephthalate available from E.I. DuPont de Nemours and Company, Wilmington, Del.

Polyester C—polytrimethylene terephthalate available from E.I. DuPont de Nemours and Company, Wilmington, Del.

Toughener—an ethylene n-butyl acrylate glycidyl methacrylate copolymer available from E.I. Du Pont de Nemours and Company, Wilmington, Del.

PEEE-A—a copolyether ester elastomer having a melting point of 203° C. (ISO 11357-1/-3), a melt flow rate 220° C., 2.16 kg of 7 g/10 min., a nominal durometer hardness of 55D available as HYTREL® 5556 from E.I. Du Pont de Nemours and Company, Wilmington, Del.

PEEE-B—a copolyether ester elastomer having a melting point of 193° C. (ISO 11357-1/-3), a melt flow rate 230° C., 2.16 kg of 12 g/10 min., a nominal durometer hardness of 45D available as HYTREL® 4556 from E.I. Du Pont de Nemours and Company, Wilmington, Del.

PEEE-C—a copolyether ester elastomer having a melting point of 150° C. (ISO 11357-1/-3), a melt flow rate 190° C., 2.16 kg of 5.3 g/10 min., a nominal durometer hardness of 40D available as HYTREL® 4056 from E.I. Du Pont de Nemours and Company, Wilmington, Del.

PEEE-D—a copolyether ester elastomer having a melting point of 156° C. (ISO 11357-1/-3), a melt flow rate 190° C., 2.16 kg of 10 g/10 min., a nominal durometer hardness of 35D available as HYTREL®) G3548L from E.I. Du Pont de Nemours and Company, Wilmington, Del.

PEEE-E—a copolyether ester elastomer having a melting point of 170° C. (ISO 11357-1/-3), a melt flow rate 190° C., 2.16 kg of 5 g/10 min., a nominal durometer hardness of 30D available as HYTREL® 3078 from E.I. Du Pont de Nemours and Company, Wilmington, Del.

PEEE-F—a copolyether ester elastomer having a melting point of 218° C. (ISO 11357-1/-3), a melt flow rate 240° C., 2.16 kg of 12.5 g/10 min., a nominal durometer hardness of 72D available as HYTREL® 7246 from E.I. Du Pont de Nemours and Company, Wilmington, Del.

Flame Retardant A (FR-A)—a brominated polystyrene available from Gbr Yulu Industry Co., Ltd., China as GBR 66NC Flame Retardant B (FR-B)—SR-T 20000, a brominated epoxy flame retardant Flame Retardant Synergist—antimony trioxide available from Shenzhen Jiefu Corp., Japan as PE FR80.

Carbon black is Cabot PE3324, which is carbon black in a polyethylene carrier, manufactured by Cabot Corp., Boston, Mass.

Antioxidant is Irganox® 1010, from Ciba Specialty Chemicals, Inc., Tarrytown, N.Y.

Methods

The above materials used in the Examples and Comparative Examples were mixed together and melted in a ZSK-40 twin screw extruder at 270° C. extrusion temperature to provide melt-mixed compositions, which were then extruded through a die located at an exit of the extruder and thereby shaped into strands, which were then cooled and pelletized.

The pelletized compositions were molded into test plates of 100 mm in length×100 mm in width×2 mm thick on an injection molding machine according to ASTM D5420. Melt temperature at a cylinder was 260° C., and mold temperature was 80° C.

The plates were cooled down for four hours at −40° C. in a chamber and then removed to measure Gardner impact (J).

Gardner Impact

The Gardner Impact (J) of the test plates was determined according to ASTM D5420. The maximum impact that can be measured using this method is 36.3 J.

Discussion and Results

This discussion reviews results in Tables 1 to 3, which report Gardner Impact (J) of test plates prepared from Examples and Comparative Examples of the compositions described herein.

A comparison of C1 with E1 to E4 shows that when the copolyether ester elastomer had Shore D hardness greater than about 50, the Gardner impact was considerably lower than when the copolyether ester elastomer had a Shore D hardness less than 50. E1 to E4 each had a copolyether ester elastomer of Shore D hardness ranging between 30 and 45 and each had a Gardner impact ranging from a low of 5.27 J to a high of 7.31 J. Each of these J values was at least 29% greater than the J value for C1.

C2 and C3 show that, for very low concentrations of toughener and copolyether ester elastomer—less than 20 parts—relative to the concentration of the polyester, the Gardner impact values were extremely low, that is, below 1, even when using a copolyether ester elastomer with Shore D hardness of 40 (C2).

C5 shows that very high concentrations of toughener and copolyether ester elastomer nonetheless achieved useful Gardner impact values. However, such high levels of toughener and copolyether ester elastomer were undesirable because of the negative effect on other properties of the composition.

C6 shows that very high concentrations of toughener and copolyether ester elastomer in combination with a copolyether ester elastomer having Shore D hardness of 72 resulted in a composition of unsuitable Gardner impact.

A comparison of C4 to E5 shows that, for equal concentrations of toughener and copolyether ester elastomer relative to the polyester concentration, suitable Gardner impact was obtained only when the Shore D hardness of the copolyether ester elastomer was less than 50. C4 had a copolyether ester elastomer having a Shore D hardness of 72.

For E6 to E11, the polyester was polyethylene terephthalate [PET] and the best J values were obtained when the ratio of the combined weight of the toughener and copolyether ester elastomer relative to the weight of the PET was greater than about 0.45.

For E12 to E17, the polyester was polytrimethylene terephthalate [PTT] and the best J values were obtained when the ratio of the combined weight of the toughener and copolyether ester elastomer relative to the weight of the PTT was greater than about 0.55.

For E18 to E24, the polyester was polybutylene terephthalate [PBT] and the specific copolyether ester elastomer had Shore D hardness ranging from 30 to 45. The ratio of the combined weight of the toughener and copolyether ester elastomer relative to the weight of the PBT ranged from 0.45 to 0.70. The ratio of the toughener to the copolyether ester elastomer ranged from 0.43 to 2.33. Each of these examples had a Gardner impact of 8.1 or greater. When the ratio of the combined weight of the toughener and copolyether ester elastomer relative to the weight of the PBT was greater than about 0.45, the J values were the highest.

C7 and C8 show that, when the ratio of the combined weight of the toughener and copolyether ester elastomer relative to the weight of the PBT, was 0.30, the Gardner impact values were below 4.2 J, even though the copolyether ester elastomers had Shore D hardness values of 30 to 40.

TABLE 1

|  | C1 | E1 | E2 | E3 | E4 | C2 | C3 | C4 | C5 | E5 | C6 |
|---|---|---|---|---|---|---|---|---|---|---|---|
| Polyester A-PBT | 55.5 | 55.5 | 55.5 | 55.5 | 55.5 | 67.05 | 67.05 | 55.5 | 47.3 | 55.5 | 47.3 |
| Toughener | 11.2 | 11.2 | 11.2 | 11.2 | 11.2 | 0 | 4 | 11.2 | 19.9 | 17.45 | 33.15 |
| PEEE-A | 13.75 |  |  |  |  |  | 9.4 |  | 13.25 |  |  |
| PEEE-B |  | 13.75 |  |  |  |  |  |  |  |  |  |
| PEEE-C |  |  | 13.75 |  |  | 13.4 |  |  |  | 7.5 |  |
| PEEE-D |  |  |  | 13.75 |  |  |  |  |  |  |  |
| PEEE-E |  |  |  |  | 13.75 |  |  |  |  |  |  |
| PEEE-F |  |  |  |  |  |  |  | 13.75 |  |  |  |
| $\frac{\text{Toughener} + \text{PEEE}}{\text{Polyester}}$ | 0.45 | 0.45 | 0.45 | 0.45 | 0.45 | 0.20 | 0.20 | 0.45 | 0.70 | 0.45 | 0.70 |
| $\frac{\text{Toughener}}{\text{PEEE}}$ | 0.81 | 0.81 | 0.81 | 0.81 | 0.81 | N/A | 0.43 | 0.81 | 1.5 | 2.33 | N/A |
| F R-A | 11.25 | 11.25 | 11.25 | 11.25 | 11.25 | 11.25 | 11.25 | 11.25 | 11.25 | 11.25 | 11.25 |
| FR Synergist | 4.5 | 4.5 | 4.5 | 4.5 | 4.5 | 4.5 | 4.5 | 4.5 | 4.5 | 4.5 | 4.5 |
| Miscellaneous additives* | 3.8 | 3.8 | 3.8 | 3.8 | 3.8 | 3.8 | 3.8 | 3.8 | 3.8 | 3.8 | 3.8 |
| Physical Properties |  |  |  |  |  |  |  |  |  |  |  |
| PEEE Hardness (Shore D) | 55 | 45 | 40 | 35 | 30 | 40 | 55 | 72 | 55 | 40 | 72 |
| Gardner Impact at −40 C. (J) | 4.08 | 6.73 | 7.31 | 5.27 | 6.99 | 0.71 | 0.74 | 1.47 | 5.15 | 4.21 | 0.72 |

*Includes lubricants, antioxidant, colorant, and drip suppressant

TABLE 2

|  | E6 | E7 | E8 | E9 | E10 | E11 | E12 | E13 | E14 | E15 | E16 | E17 |
|---|---|---|---|---|---|---|---|---|---|---|---|---|
| Polyester B-PET | 52.0 | 48.7 | 44.35 | 47.15 | 48.7 | 47.15 |  |  |  |  |  |  |
| Polyester C-PTT |  |  |  |  |  |  | 51.9 | 53.6 | 53.6 | 47.3 | 50.3 | 47.3 |
| Toughener | 7.05 | 8.05 | 15.55 | 17.0 | 8.05 | 14.15 | 8.55 | 13.425 | 16.0 | 9.95 | 15.075 | 20.0 |
| PEEE-B |  |  |  |  |  |  |  |  |  |  |  |  |
| PEEE-C |  |  |  |  | 18.7 | 14.15 |  |  |  | 23.2 | 15.075 | 13.15 |
| PEEE-E | 16.4 | 18.7 | 15.55 | 11.3 |  |  | 20.0 | 13.425 | 10.85 |  |  |  |
| $\frac{\text{Toughener} + \text{PEEE}}{\text{Polyester}}$ | 0.45 | 0.55 | 0.70 | 0.60 | 0.55 | 0.60 | 0.55 | 0.50 | 0.50 | 0.70 | 0.60 | 0.70 |
| $\frac{\text{Toughener}}{\text{PEEE}}$ | 0.43 | 0.43 | 1.00 | 1.50 | 0.43 | 1.00 | 0.43 | 0.5 | 1.5 | 0.43 | 0.5 | 1.5 |
| F R-A | 11.25 | 11.25 | 11.25 | 11.25 | 11.25 | 11.25 | 11.25 | 11.25 | 11.25 | 11.25 | 11.25 | 11.25 |
| F R Synergist | 4.5 | 4.5 | 4.5 | 4.5 | 4.5 | 4.5 | 4.5 | 4.5 | 4.5 | 4.5 | 4.5 | 4.5 |
| Nucleating Agent | 5.0 | 5.0 | 5.0 | 5.0 | 5.0 | 5.0 | 0 | 0 | 0 | 0 | 0 | 0 |
| Miscellaneous additives* | 3.8 | 3.8 | 3.8 | 3.8 | 3.8 | 3.8 | 3.8 | 3.8 | 3.8 | 3.8 | 3.8 | 3.8 |
| Physical Properties |  |  |  |  |  |  |  |  |  |  |  |  |
| PEEE Hardness (Shore D) | 30 | 30 | 30 | 30 | 40 | 40 | 30 | 30 | 30 | 40 | 40 | 40 |
| Gardner Impact at −40 C. (J) | 5.54 | 5.77 | 8.33 | 6.14 | 9.84 | 10.37 | 5.71 | 6.92 | 5.19 | 7.42 | 13.23 | 10.21 |

TABLE 3

|  | E18 | C7 | E19 | E20 | E21 | C8 | E22 | E23 | E24 |
|---|---|---|---|---|---|---|---|---|---|
| Polyester A-PBT | 47.30 | 61.90 | 47.30 | 47.30 | 51.90 | 61.90 | 47.30 | 55.50 | 47.30 |
| Toughener | 9.95 | 11.15 | 23.20 | 9.95 | 17.15 | 13.00 | 23.20 | 15.00 | 23.20 |
| PEEE-B |  |  |  |  |  |  |  | 9.95 | 9.95 |
| PEEE-C |  |  |  | 23.20 | 11.40 | 5.55 | 9.95 |  |  |
| PEEE-E | 23.20 | 7.40 | 9.95 |  |  |  |  |  |  |
| $\frac{\text{Toughener} + \text{PEEE}}{\text{Polyester}}$ | 0.70 | .30 | 0.70 | 0.70 | 0.55 | .30 | 0.70 | 0.45 | 0.70 |
| $\frac{\text{Toughener}}{\text{PEEE}}$ | 0.43 | 1.5 | 2.33 | 0.43 | 1.5 | 2.33 | 2.33 | 1.5 | 2.33 |
| F R-A | 11.25 | 11.25 | 11.25 | 11.25 | 11.25 | 11.25 | 11.25 | 11.25 | 11.25 |
| F R Synergist | 4.5 | 4.5 | 4.5 | 4.5 | 4.5 | 4.5 | 4.5 | 4.5 | 4.5 |
| Miscellaneous additives* | 3.8 | 3.8 | 3.8 | 3.8 | 3.8 | 3.8 | 3.8 | 3.8 | 3.8 |

TABLE 3-continued

|  | E18 | C7 | E19 | E20 | E21 | C8 | E22 | E23 | E24 |
|---|---|---|---|---|---|---|---|---|---|
| Physical Properties | | | | | | | | | |
| PEEE Hardness (Shore D) | 30 | 30 | 30 | 40 | 40 | 40 | 40 | 45 | 45 |
| Gardner Impact at −40 C. (J) | 19.1 | 2.5 | 22.5 | 8.1 | 25.0 | 3.4 | 23.8 | 10.5 | 25.8 |

Table 4 shows Gardner Impact (J) values of test plates made from compositions described herein that include both a halogenated epoxy flame retardant and a flame retardant synergist. A comparison of C9 with E25 to E28 shows that, when the halogenated flame retardant is brominated polystyrene, the Gardner impact is considerably lower than when the flame retardant is a halogenated epoxy flame retardant.

TABLE 4

|  | E25 | E26 | E27 | E28 | C9 |
|---|---|---|---|---|---|
| Polyester A-PBT | 39.00 | 36.00 | 31.00 | 41.70 | 41.70 |
| Toughener | 11.25 | 11.25 | 11.25 | 11.25 | 11.25 |
| PEEE-B | 13.75 | 13.75 | 13.75 | 13.75 | 13.75 |
| $\dfrac{\text{Toughener} + \text{PEEE}}{\text{Polyester}}$ | 0.64 | 0.69 | 0.81 | 0.60 | 0.60 |
| $\dfrac{\text{Toughener}}{\text{PEEE}}$ | 0.43 | 1.5 | 2.33 | 0.82 | 0.82 |
| F R-A | | | | | 21.00 |
| F R-B | 24.00 | 27.00 | 30.00 | 21.00 | |
| F R Synergist | 6 | 6 | 8 | 6 | 6 |
| Miscellaneous additives* | 1.0 | 1.0 | 1.0 | 1.3 | 1.3 |
| Carbon black | 5 | 5 | 5 | 5 | 5 |
| Physical Properties | | | | | |
| PEEE Hardness (Shore D) | 30 | 30 | 30 | 45 | 45 |
| Gardner Impact at −40 C. (J) | >36.3** | >36.3** | 25.7 | 25.10 | 1.61 |

*Includes lubricants, antioxidants, and drip suppressant
**36.3 J is maximum, measurable value by ASTM D5420

What is claimed is:

1. A composition comprising:
   (a) 30 to 65 weight percent of a polyester;
   (b) 7 to 25 weight percent of an ethylene copolymer toughener;
   (c) 5 to 25 weight percent of a copolyether ester elastomer having a shore D hardness that ranges from 20 to 50;
   (d) optionally, a flame retardant; and
   (e) when (d) is present in the composition, optionally a flame retardant synergist,
   wherein:
   the ratio of the combined weight of (b)+(c) relative to the weight of (a) ranges from 0.40 to 0.85;
   the ratio of the weight of (b) relative to that of (c) ranges from 0.3 to 2.5; and
   the Gardner impact of the composition, when molded, is at least 4.2 J, measured at −40° C. according to ASTM D5420.

2. The composition of claim 1, wherein the flame retardant, when present, is selected from halogenated polymers, halogenated epoxy flame retardants, and mixtures of these.

3. The composition of claim 2, wherein:
   when the flame retardant is a halogenated epoxy flame retardant, its concentration ranges from 15 to 35 weight percent of the total weight of the composition; and
   the Gardner impact of the composition, when molded, is at least 7 J.

4. The composition of claim 2, wherein the shore D hardness of the copolyether ester elastomer ranges from 25 to 45.

5. The composition of claim 2, wherein the ratio of the combined weight of (b) plus (c) relative to the weight of (a) ranges from 0.45 to 0.85.

6. The composition of claim 2, wherein the ethylene copolymer toughener comprises copolymerized monomers of ethylene and glycidyl methacrylate, and either n-butyl acrylate or ethyl acrylate.

7. The composition of claim 2, wherein the polyester is selected from the group consisting of poly(ethylene terephthalate), poly(trimethylene terephthalate), poly(1,4-butylene terephthalate), and mixtures of these.

8. An article comprising the composition of claim 2.

9. The article of claim 8, in the form of a photovoltaic junction box or a photovoltaic connector.

10. A method of making an article comprising:
    molding a melt-mixed composition comprising:
    (a) 30 to 65 weight percent of a polyester;
    (b) 7 to 25 weight percent of an ethylene copolymer toughener;
    (c) 5 to 25 weight percent of a copolyether ester elastomer having a shore D hardness that ranges from 20 to 50;
    (d) optionally, a flame retardant; and
    (e) when (d) is present in the composition, optionally a flame retardant synergist, wherein:
    the ratio of the combined weight of (b)+(c) relative to that of (a) ranges from 0.40 to 0.85;
    the ratio of the weight of (b) to that of (c) ranges from 0.3 to 2.5; and
    the Gardner impact of the article is at least 4.2 J, measured at −40° C. according to ASTM D5420.

11. The method of claim 10, wherein the flame retardant, when present, is selected from halogenated polymers, halogenated epoxy flame retardants, and mixtures of these.

12. The method of claim 11, wherein:
    when the flame retardant is a halogenated epoxy flame retardant, its concentration ranges from 15 to 35 weight percent of the total weight of the composition and the Gardner impact of the article is at least 7 J.

13. The method of claim 11, wherein the shore D hardness of the copolyether ester elastomer ranges from 25 to 45.

14. The method of claim 11, wherein the ethylene copolymer toughener comprises copolymerized monomers of ethylene and glycidyl methacrylate, and either n-butyl acrylate or ethyl acrylate.

* * * * *